United States Patent
Watanabe

(10) Patent No.: US 7,631,141 B2
(45) Date of Patent: Dec. 8, 2009

(54) TAPE DRIVE STORAGE DEVICE FOR WRITING DATA FORWARD AND BACKWARD IN PREDETERMINED LENGTHS

(75) Inventor: Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/846,318

(22) Filed: May 14, 2004

(65) Prior Publication Data

US 2004/0230741 A1    Nov. 18, 2004

(30) Foreign Application Priority Data

May 16, 2003    (JP)    ............... 2003-139063

(51) Int. Cl.
*G06F 12/00*    (2006.01)
(52) U.S. Cl. ........................... 711/111; 360/75
(58) Field of Classification Search .................. 711/111
See application file for complete search history.

(56) References Cited

U.S. PATENT DOCUMENTS

| | | | | |
|---|---|---|---|---|
| 4,410,942 A | * | 10/1983 | Milligan et al. | ............... 710/61 |
| 4,819,099 A | * | 4/1989 | Saito | ........................... 360/84 |
| 5,287,229 A | * | 2/1994 | Saito et al. | .................... 360/60 |
| 6,286,088 B1 | * | 9/2001 | Campbell et al. | ........... 711/165 |
| 2003/0142429 A1 | * | 7/2003 | Ataku et al. | .................... 360/51 |

FOREIGN PATENT DOCUMENTS

| | | |
|---|---|---|
| JP | 61-099904 | 5/1986 |
| JP | 10-289537 | 10/1998 |
| WO | WO00/08561 | * 2/2000 |

* cited by examiner

*Primary Examiner*—Matt Kim
*Assistant Examiner*—Kaushikkumar Patel
(74) *Attorney, Agent, or Firm*—Dillon & Yudell LLP

(57) ABSTRACT

A data storage device for writing data. When data is written to tape, a predetermined length of tape is allocated on a first track for the data. The data is forward written on a first track and reverse written, in the same sequence, on a second track on the tape. If the data cannot be written on the predetermined length of tape, then a linking writer writes the data in a length unrestricted on the tape, and the predetermined length of tape is adjusted for the next data to be written to the tape.

10 Claims, 10 Drawing Sheets

| Progress quantity standard value | 180 | 270 | 360 | 450 | 540 |
|---|---|---|---|---|---|
| Processing time [sec] | 11011 | 10515 | 10264 | 10118 | 10019 |
| Maximum rewinding time [sec] | 29 | 44 | 58 | 73 | 87 |

(a)

(b)

TAPE DRIVE STORAGE DEVICE FOR WRITING DATA FORWARD AND BACKWARD IN PREDETERMINED LENGTHS

PRIORITY CLAIM

This application claims priority of Japanese Patent Application No. 2003-139063, filed on May 16, 2003, and entitled, "Storage Device, Control Method, Program And Storage Media."

BACKGROUND OF THE INVENTION

1. Technical Field

The present invention relates to a storage device, a control method, a program and a storage media. More particularly, the invention relates to a storage device for controlling a method for writing data into a data storage media, a control method, a program and a storage media.

2. Description of Related Art

In recent years, as the high speed and large capacity tape drive standards, the LTO (Linear Tape Open) standards have gained attention. "LTO standards," defined by Hewlett Packard Corporation, International Business Machines Corporation, and Seagate Technologies Corporation, URL: www.lto-technology.com, retrieved on Apr. 9, 2003 are incorporated herein by reference in their entirety. A tape drive unit conforming to the above standards writes the write data in a tape storage media without accumulating the write data in a buffer within the device in case of receiving write data to be written in the tape storage media associated with an explicit write order (e.g., SYNC instruction) for writing the write data in the tape storage media. Thereby, even when a power of the tape drive unit is shut down inadvertently, it is assured that the write data is written in the tape storage media.

However, when the storage device frequently receives a forced write order, the time required to write the write data into the tape storage media per unit volume of write data is increased, so that the storage device is less efficient.

Thus, it is an object of the invention to provide a storage device, a control method, a program and a storage media that can solve the above-mentioned problem. This object is achieved by combining the features described in the independent claim as set forth in the appended claims. Also, the dependent claims define more beneficial specific examples of the invention.

SUMMARY OF THE INVENTION

According to a first form of the present invention, there is provided a data storage device writing plural write data to a data storage media sequentially by predetermined size segment unit, comprising a sequential writer writing the write data to at least one of the segment of the media about each of the plural write data by segment unit, which order the write data to the data storage media is received, and a linking writer writing a linked write data to a segment whose number is smaller than a segment which was needed to the plural write data in the data storage media. The linked write data is linked to data which were written after a one write data, the one write data being one of the plural write data which was written to the data storage media by the sequential writer in case size of the one write data is smaller than a predetermined size. Also, a program for controlling the storage device, and a storage media for storing the program are provided.

The above outline of the invention does not list all the necessary features of the invention, but a sub-combination of these features may also constitute the invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

The preferred embodiments of the present invention will be described below. However, the invention is not limited to the following embodiments, but only defined in the appended claims. Moreover, all the combinations of features as described in the embodiments may not be requisite to the solving means of the invention.

Figure 1:
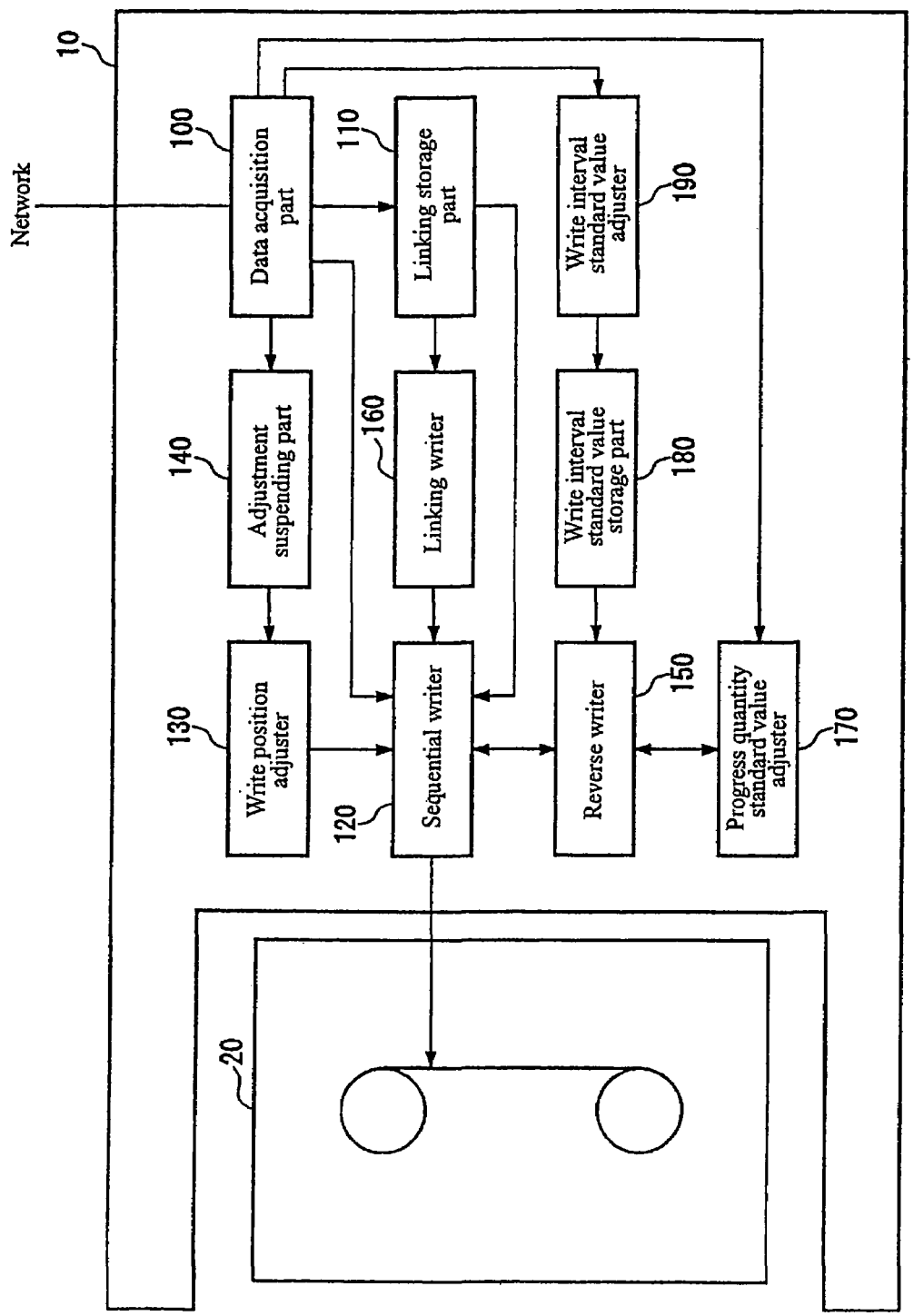
FIG. 1 is a block diagram of a tape storage unit.

FIG. 1 is a block diagram of a tape storage unit 10. The tape storage unit 10 writes plural write data sequentially in a tape storage media 20 as one example of a data storage media by a predetermined size segment unit by progressing the tape storage media 20. The tape storage unit 10 comprises a data acquisition part 100, a linking storage part 110, a sequential writer 120, a write position adjuster 130, an adjustment suspending part 140, a reverse writer 150, a linking writer 160, a progress quantity standard value adjuster 170, a write interval standard value storage part 180 and a write interval standard value adjuster 190.

The data acquisition part 100 acquires sequentially plural write data to be written into the tape storage media 20 from an external host computer via a network in accordance with a forced write order for writing the write data into the tape storage media 20 and sends the acquired write data to the linking storage part 110 and the sequential writer 120. Also, the data acquisition part 100 measures the time interval for acquiring the plural write data and sends the measured result to the linking storage part 110 and the adjustment suspending part 140. Also, the data acquisition part 100 sends the size information indicating the size of write data to the adjustment suspending part 140 and the write interval standard value adjuster 190 every time of acquiring each of the plural write data. Also, the data acquisition part 100 acquires the end of data information (e.g., EOD information: End of Data information) indicating the end of data for the plural write data and sends it to the progress quantity standard value adjuster 170.

Herein, the forced write order is the order for storing the write data in the buffer within the tape storage unit 10 and explicitly indicating to write the write data into the tape storage media 20. As one example, there is a SYNC instruction for making the write data received by the tape storage unit 10 and the write data written in the tape storage media 20 synchronous.

The linking storage part 110 links sequentially the write data to the write data already received before receiving the write data, every time of receiving the write data after the one write data in accordance with a forced write order, when the size of one write data received from the data acquisition part 100 is smaller than a predetermined size, and stores the linked data. Also, the linking storage part 110 receives the measured result of measuring the time interval of acquiring the plural write data from the data acquisition part 100, and changes the predetermined size in accordance with the measured result.

The sequential writer 120 writes the write data into at least one segment of the tape storage media 20 by a segment unit for each of the plural write data, every time of receiving the write data from the data acquisition part 100 in accordance with a forced write order. And the sequential writer 120 decides a write position for writing the write data at the next time in accordance with a write position adjustment order received from the write position adjuster 130. Moreover, the sequential writer 120 changes the progress direction of the tape storage media 20 in case of receiving a reverse order for reversing the progress direction of the tape storage media 20 from the reverse writer 150. Furthermore, the sequential writer 120 sends the information indicating the progress quantity of progressing the tape storage media 20 to write the write data to the reverse writer 150.

Also, the sequential writer 120 write a segment including one write data and the write data received before the one write data in the linking storage part 110 into the tape storage media 20, every time of receiving the write data after the one write data from the data acquisition part 100, in case of receiving the one write data of the size smaller than a predetermined size. Also, the sequential writer 120 writes the received write data into the tape storage media 20, in case of receiving the write data from the linking writer 160.

The write position adjuster 130 sends a write position adjustment order for adjusting the write position of the next write data to the sequential writer 120 to make closer the write position of the write data and the write position of the next write data to the write data in the tape storage media 20, every time the sequential writer 120 writes each of plural write data. Also, the write position adjuster 130 suspends the adjustment of write position in accordance with an order from the adjustment suspending part 140. To make closer the write positions is not limited to making closer the physical write positions in the tape storage media 20. For example, the write position adjuster 130 may adjust the write position of the next write data to shorten the time required to read the write data and the next write data.

As one example of adjusting the write position, the write position adjuster 130 rewinds (Backhitch) the tape storage media 20. That is, the tape storage media 10 sequentially writes the write data, while continuing to progress the tape storage media 20, and progresses the tape storage media 20 during a time interval from the time of receiving the write data to the time of receiving the next write data, if any. As a result, the capacity ratio of write data to be written into the tape storage media 20 is smaller. Accordingly, the write position adjuster 130 writes the plural write data into the tape storage media 20 in efficient manner by rewinding the tape storage media 20 by a predetermined amount, every time of writing the write data. Alternatively, the write position adjuster 130 may adjust the write position by adjusting the position of a write head used for writing.

The adjustment suspending part 140 suspends the write position adjuster 130 to adjust the write position of write data to be written after one write data, in case that it is judged that the size of one write data received by the data acquisition part 100 is smaller than a predetermined size, based on the size information received from the data acquisition part 100. In this case, the sequential writer 120 performs a Backhitchless Flush for writing the write data into the tape storage media 20 without performing the rewinding process (Backhitch), and operates faster than the rewinding process. Also, the adjustment suspending part 140 receives the measured result of measuring the time interval for acquiring the plural write data from the data acquisition part 100, and changes the predetermined size in accordance with the measured result.

The reverse writer 150 receives the information indicating the progress quantity by which the sequential writer 120 progresses the tape storage media 20 from the sequential writer 120. And the reverse writer 150 sends a reverse order of reversing the progress direction of the tape storage media 20 to the sequential writer 120, in case that the progress quantity by the sequential writer 120 reaches the progress quantity standard value. More particularly, the reverse writer 150 acquires the write interval standard value indicating the interval between the write positions of the write data from the write interval standard value storage part 180, designates the write data to be written at the time when the progress quantity standard value is reached, based on the write interval standard value and the progress quantity by which the sequential writer 120 progresses the tape storage media 20, and judges that the progress quantity by the sequential writer 120 reaches the progress quantity standard value, if the designated write data is sequentially written into the sequential writer 120. As a result, the reverse writer 150 sequentially writes the write data into the tape storage media 20 in a write direction different from the write direction in which the sequential writer 120 writes.

Also, the reverse writer 150 sends the information indicating the progress quantity of progressing the tape storage media 20 after reversing the progress direction to the progress quantity standard value adjuster 170. Moreover, the reverse writer 150 changes the progress quantity standard value in accordance with an order from the progress quantity standard value adjuster 170.

The linking writer 160 links the write data stored in the linking storage part 110, namely, plural write data written after one write data of the size smaller than a predetermined size among the plural write data written into the tape storage media 20 by the sequential writer 120. And the linking writer 160 sends the linked plural write data to the sequential writer 120 to write the linked plural write data into a smaller number of segments than the number of segments on the tape storage media 20 needed to write the plural write data to be linked.

The progress quantity standard value adjuster 170 issues an order to the reverse writer 150 to adjust the progress quantity standard value of the plural write data to be written next to the plural write data in accordance with a total size of plural write data. For example, the progress quantity standard value adjuster 170 issues an order to the reverse writer 150 to set the progress quantity standard value of the plural write data to be written at the next time to a smaller value than the progress quantity standard value for use in writing the plural write data, in case that it is judged that writing of the plural write data is finished by receiving the end of data information from the data acquisition part 100 before an accumulated progress quantity received from the reverse writer 150 reaches the progress quantity standard value. On the other hand, the progress quantity standard value adjuster 170 issues an order to the reverse writer 150 to set the progress quantity standard value of the plural write data to be written at the next time to a larger value than the progress quantity standard value used in writing the plural write data, in case that it is judged that writing the plural write data is not finished without receiving the end of data information from the data acquisition part 100, even after an accumulated progress quantity received from the reverse writer 150 reaches the progress quantity standard value.

The write interval standard value storage part 180 stores the write interval standard value as an estimate of the write position interval for writing the plural write data by the sequential writer 120 on the tape storage media 20. And the write interval standard value adjuster 190 sets the write interval standard value stored in the write interval standard value storage part 180 to a larger value than the predetermined size for the write data, in case that the size of write data received from the data acquisition part 100 is smaller than a predetermined size.

In this manner, the tape storage device 10 suspends to adjust the write position of write data after one write data, in case of detecting one write data of the size smaller than a predetermined size. Thereby, the tape storage device 10 performs high speed writing by saving the rewind time for rewinding the tape storage media 20 to adjust the write position. Also, the tape storage device 10 stores the write data after the one write data in the linking storage part 110 and links and rewrites the write data into the tape storage media 20, in case of detecting one write data of the size smaller than a predetermined size. Thereby, the tape storage device 10 efficiently employs the storage area of the tape storage media 20.

Figure 2:
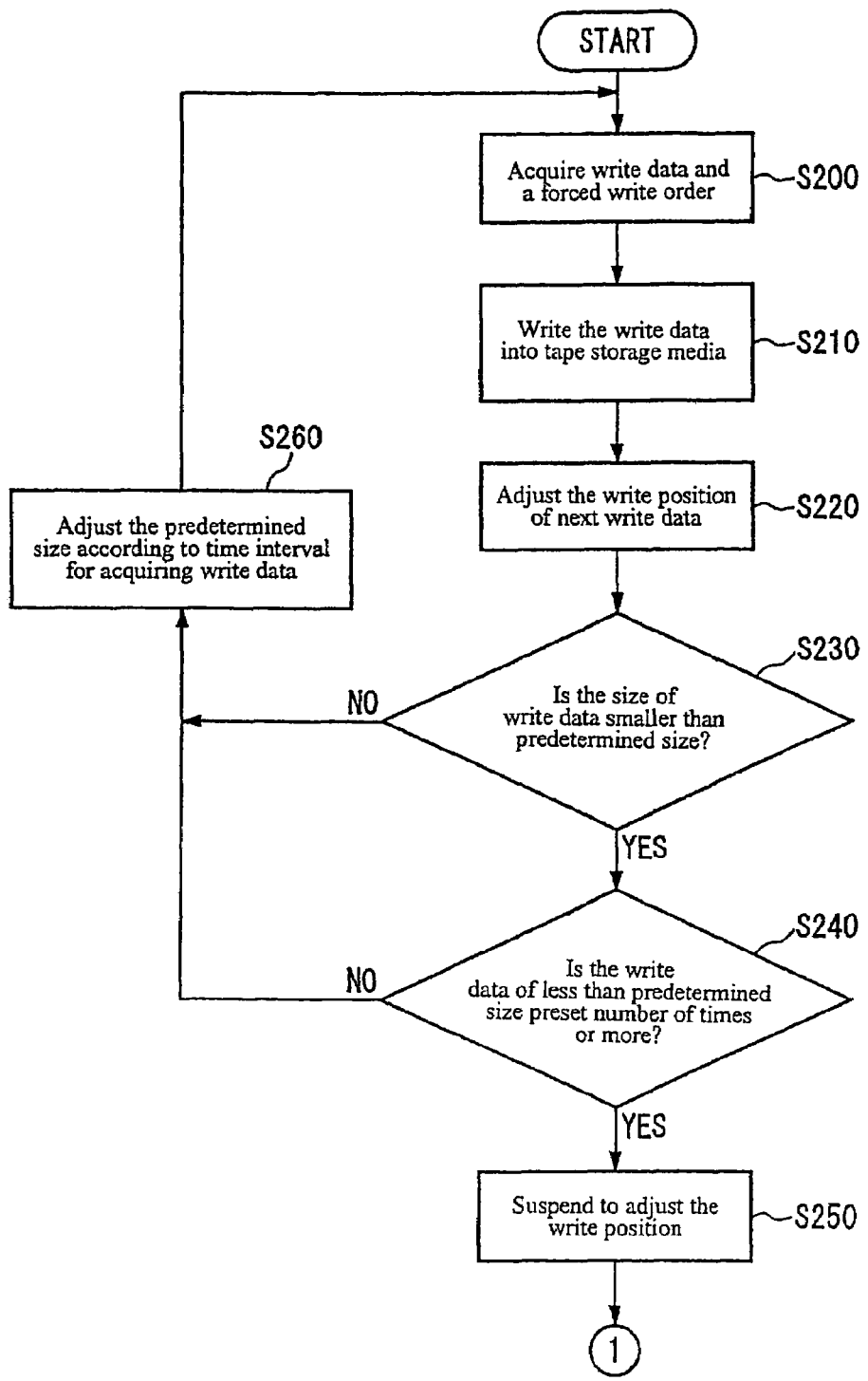
FIG. 2 is a flowchart of the tape storage unit.

FIG. 2 is a flowchart of steps taken by the tape storage device 10 in a preferred embodiment of the present invention. The tape storage device 10 performs the following process for backhitch writing. The data acquisition part 100 sequentially acquires each of plural write data via a network in accordance with a forced write order (S200). The sequential writer 120 sequentially writes each of the plural write data into at least one segment of the tape storage media 20 (S210). Then, the write position adjuster 130 adjusts the write position of the next write data to make closer the write position of the write data and the write position of the next write data in the tape storage media 20, every time the sequential writer 120 writes each of the plural write data (S220).

In case that it is judged that the size of one write data received by the data acquisition part 100 is smaller than a predetermined size (S230: YES), and the write data of the size smaller than the predetermined size is already written a preset number of times or more (S240: YES), the adjustment suspending part 140 suspends the backhitch writing of the write data to be written after one write data, namely, suspends the write position adjuster 130 to adjust the write position (S250). Then, the procedure goes to step S300 in FIG. 3. On the other hand, in case that the size of one write data received by the data acquisition part 100 is larger than the predetermined size (S230: NO), or the number of writing the write data of the size smaller than the predetermined size is less than the preset number of times (S240: NO), the adjustment suspending part 140 adjusts the predetermined size in accordance with the time interval for which the data acquisition part 100 acquires the write data (S260). Then, the procedure returns to step S200. The timing at which the adjustment suspending part 140 adjusts the predetermined size is only one example, but may be another timing. For example, the adjustment suspending part 140 may adjust the predetermined size, every time the data acquisition part 100 receives the write data, or the write data is received a preset number of times.

Figure 3:
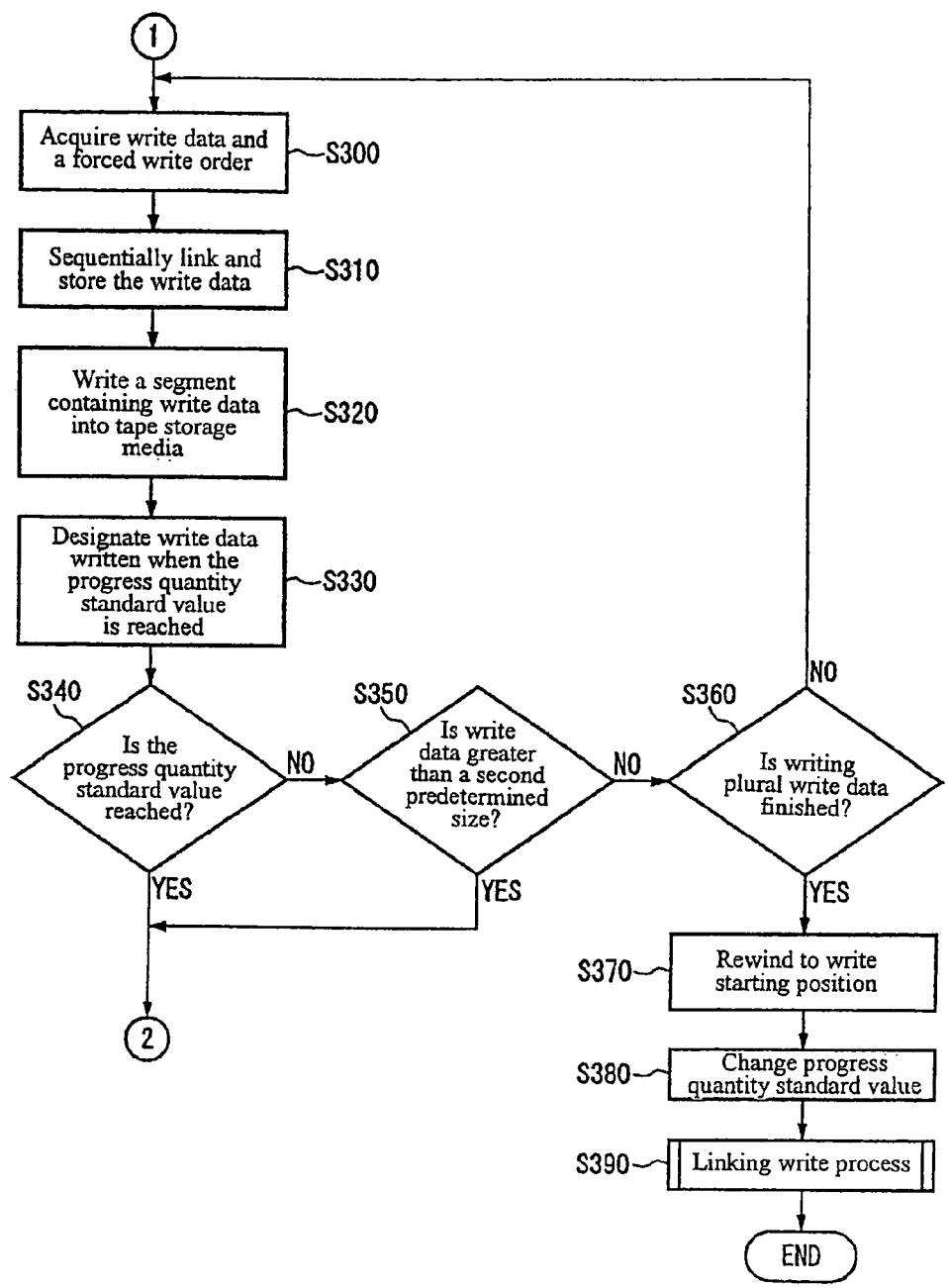
FIG. 3 is a flowchart of the tape storage unit continued from FIG. 2.

FIG. 3 is a flowchart of the tape storage device 10, continued from FIG. 2. The tape storage device 10 performs the following process to make accumulating writing by accumulating and writing the write data. The data acquisition part 100 sequentially acquires each of the plural write data via the network from the outside in accordance with a forced write order (S300). And the linking storage part 110 sequentially links the write data to the write data already received before receiving the write data and stores the linked write data, every time of receiving the write data after the one write data of the size smaller than the predetermined size (S310). And the sequential writer 120 writes a segment including the write data and the write data received before the write data in the linking storage part 110 into the tape storage media 20, every time of receiving the write data after the one write data in accordance with a forced write order (S320).

Subsequently, the reverse writer 150 designates the write data to be written at the time when the progress quantity standard value is reached, based on the write interval standard value indicating the interval between the write positions of the write data (S330). The reverse writer 150 moves to step S400 of FIG. 4, in case that the designated write data is written by the sequential writer 120, namely, the progress quantity of the tape storage media 20 by the sequential writer 120 reaches the progress quantity standard value (S340: YES). On the other hand, in case that the progress quantity of the tape storage media 20 by the sequential writer 120 does not reach the progress quantity standard value (S340: NO), the reverse writer 150 judges whether or not the size of other write data after the one write data of the size smaller than the predetermined size is larger than a second predetermined size that is set to be greater than the predetermined size (S350).

In case that the size of other write data is larger than the second predetermined size (S350: YES), the tape storage device 10 moves to step S400 of FIG. 4. On the other hand, in case that the size of other write data is less than or equal to the second predetermined size (S350: NO), the progress quantity standard value adjuster 170 judges whether or not writing the plural write data is finished (S360). If writing the plural write data is not finished (S360: NO), the tape storage device 10 returns to step S300.

On the other hand, in case that writing the plural write data is finished (S360: YES), the sequential writer 120 rewinds the tape storage media 20 to the starting position of starting to write the write data after the one write data (S370), the progress quantity standard value adjuster 170 changes the progress quantity standard value, as needed (S380), and the linking writer 160 links the write data after the one write data and before the other write data, and writes the linked write data (S390). Then, the procedure is ended.

Figure 4:
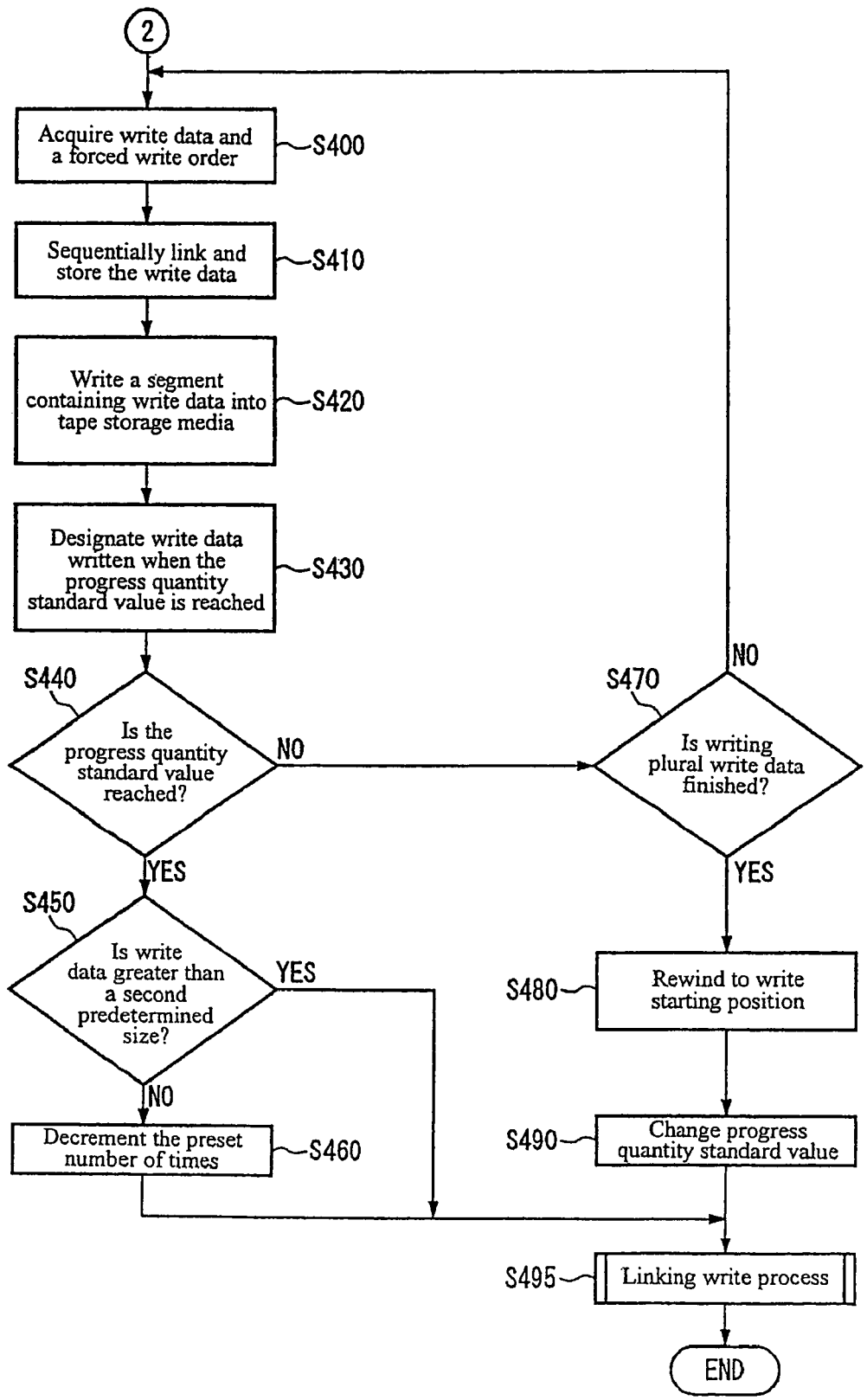
FIG. 4 is a flowchart of the tape storage unit continued from FIG. 3.

FIG. 4 is a flowchart of the tape storage device 10, continued from FIG. 3. In FIG. 4, the adjustment suspending part 140 reverses the progress direction of the tape storage media 20 and the tape storage device 10 makes the accumulating writing in the reversed progress direction. The data acquisition part 100 sequentially acquires each of the plural write data via the network from the outside in accordance with a forced write order (S400). And the linking storage part 110 sequentially links the write data to the write data already received before receiving the write data and stores the linked write data, every time of receiving the write data after the one write data of the size smaller than the predetermined size (S410). Then, the adjustment suspending part 140 writes a segment in the linking storage part 110 into the tape storage media 20 in a write direction different from the write direction in which the sequential writer 120 writes the write data into the tape storage media 20, every time of receiving the write data after the one write data in accordance with a forced write order (S420).

Subsequently, the reverse writer 150 designates the write data to be written at the time when the progress quantity standard value is reached, based on the write interval standard value indicating the interval between the write positions of the write data (S430). The reverse writer 150 judges whether or not the size of other write data after the one write data of the size smaller than the predetermined size is larger than the second predetermined size (S450), in case that the designated write data is written by the sequential writer 120, namely, the progress quantity of the tape storage media 20 by the adjustment suspending part 140 reaches the progress quantity standard value (S440: YES). In case that the size of other write data is less than or equal to the second predetermined size (S450: NO), the linking writer 160 decrements the preset number of times (S460), and links the write data after the one write data and writes the linked write data (S495). The procedure is ended. On the other hand, in case that the size of other write data is larger than the second predetermined size (S450: YES), the procedure moves to step S495, and then is ended.

On the other hand, in case that the progress quantity of the tape storage media 20 by the adjustment suspending part 140 is less than the progress quantity standard value (S440: NO), the progress quantity standard value adjuster 170 judges whether or not writing the plural write data is finished (S470). If writing the plural write data is not finished (S470: NO), the tape storage device 10 returns to step S400. On the other hand, in case that writing the plural write data is finished (S470: YES), the sequential writer 120 rewinds the tape storage device 20 to the write starting position of starting to write the write data after the one write data (S480), the progress quantity standard value adjuster 170 changes the progress quantity standard value, as needed (S490), and the linking writer 160 links the write data after the one write data and before the other write data, and writes the linked write data (S495). Then, the procedure is ended.

Figure 5:
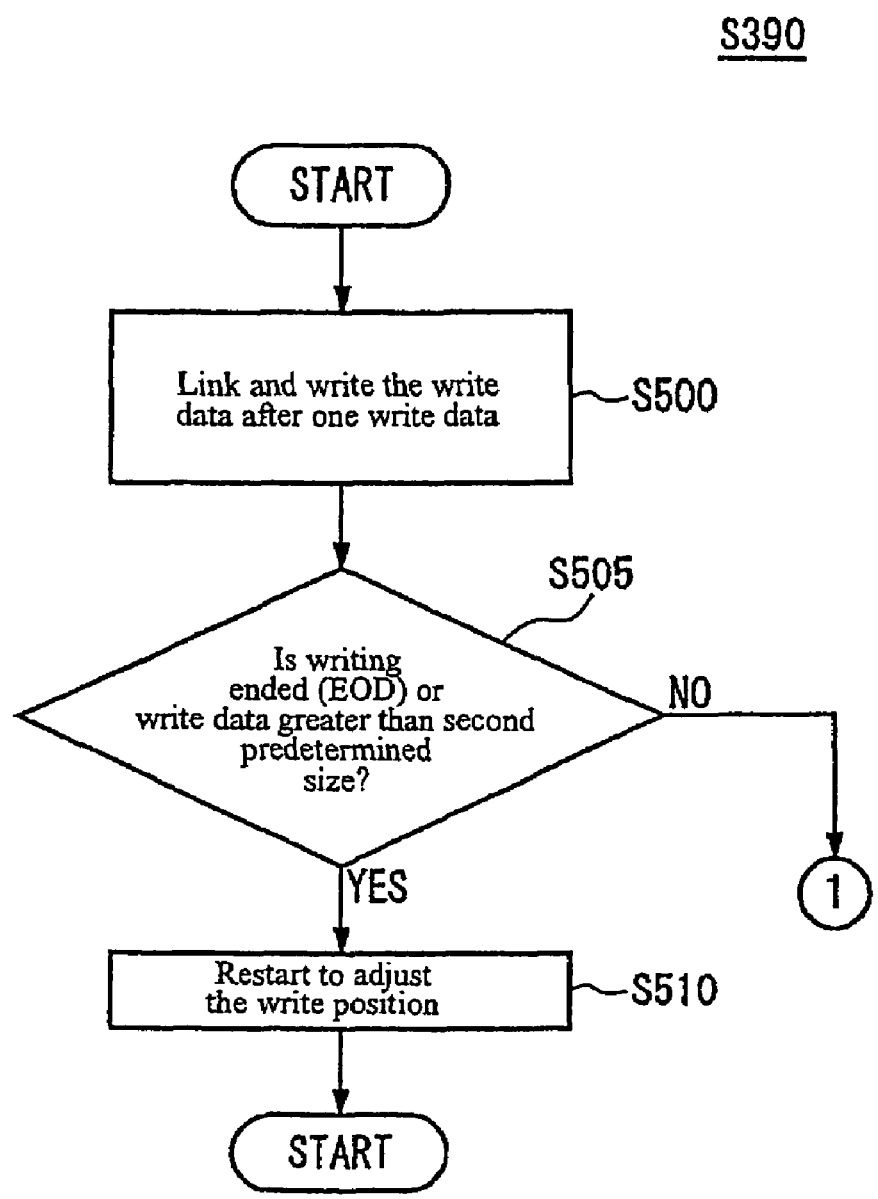
FIG. 5 is a flowchart of the tape storage unit at S390 in FIG. 3.

FIG. 5 is a flowchart of preferred processes according to the present invention of the tape storage device 10 at S390 in FIG. 3. The linking storage part 110 links the write data sequentially stored by the linking storage part 110, namely, the plural write data after the one write data of the size smaller than the predetermined size. And the linking writer 160 enables the sequential writer 120 to write the linked plural write data into a smaller number of segments than the number of segments on the tape storage media 20 required to write the plural write data to be linked (S500).

The write position adjuster 130 adjusts the write position by the sequential writer 120, namely, restarts the backhitch write (S510), in case that writing the plural write data is finished (EOD information is received), or any of the other write data after the one write data to be linked at the starting point has a larger size than the second predetermined size (S505: YES). On the other hand, in case that writing the plural write data is not finished, and any of the other write data after the one write data to be linked at the starting point has a smaller size than the second predetermined size (S505: NO), the tape storage device 10 returns to step S300 of FIG. 3.

Figure 6:
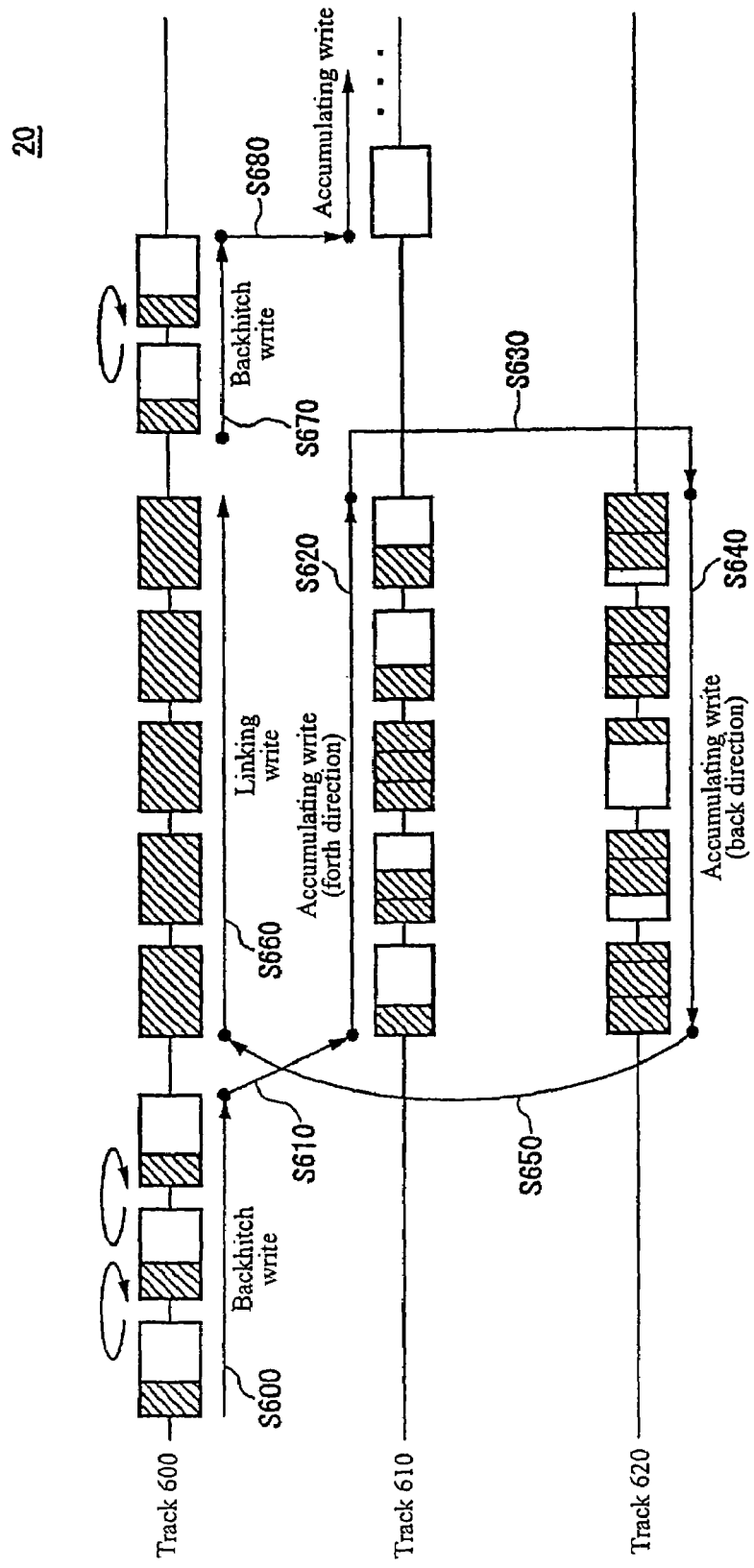
FIG. 6 shows a first example of the tape storage media on which write data is written by the tape storage unit.

FIG. 6 shows a first example of the tape storage media 20 on which write data is written by the tape storage device 10.

The tape storage media 20 has plural tracks for sequentially recording the write data, for example, track 600, track 610 and track 620. The tape storage device 10 performs the backhitch writing, every time of receiving the write data from the outside (S600). That is, the sequential writer 120 sequentially writes the write data into the tape storage media 20, and the write position adjuster 130 adjusts the write position of the next write data to make closer the write position of the write data and the write position of the write data to be written next to the write data on the tape storage media 20, every time the sequential writer 120 writes the write data. In this case, the sequential writer 120 writes the write data into the tape storage media 20 by a segment unit to place an area beyond the end of data in the segment for writing the end of data in an unusable or empty state.

The linking writer 160 starts the accumulating writing to link the plural write data written after one write data, in case of detecting the write data of the size smaller than the predetermined size a preset number of times or more prior to the one write data, when the one write data of the size smaller than the predetermined size is detected (S610). That is, the linking storage part 110 sequentially links each of the plural write data after the one write data to the write data already received before writing the write data and accumulates the write data.

The sequential writer 120 sequentially writes the write data into track 610 that is a first track on the tape storage media 20 from a predetermined write starting position in the tape storage media 20, for example, the position at which backhitch writing in track 600 is finished, to the position at which the progress quantity of progressing the tape storage media 20 reaches the predetermined progress quantity standard value (S620). In this case, the sequential writer 120 writes a segment including the write data and the write data received before the write data in the linking storage part 110 into the track 610.

In case that the progress quantity by the sequential writer 120 reaches the progress quantity standard value (S630), the reverse writer 150 sequentially writes the write data in track 620 that is a second track different from the track 610 in a write direction different from the write direction of writing into the track 610 (S640). The linking writer 160 links and writes the write data, in case that the progress quantity by the reverse writer 150 reaches the progress quantity standard value (S650). More specifically, the linking writer 160 links the write data written by the sequential writer 120 and the reverse writer 150, which are acquired from the linking storage part 110, and writes the linked write data from the write starting position on the tape storage media 20 into the track 600 in which the sequential writer 120 writes the write data before the one write data (S660). In the above, the combination of accumulating writing and linking writing is the RABF (Recursive Accumulating Backhitchless Flush) writing. The tape storage device 10 performs high speed and high efficient writing by this RABF writing while meeting the write requirements for writing the write data into the tape storage media 20 reliably. Subsequently, the write position adjuster 130 restarts to adjust the write position, whereby the tape storage device 10 restarts the backhitch writing (S670). Then, the linking writer 160 sets the preset number of times for use to judge whether or not to transfer to the accumulating writing to be smaller than the other plural write data written before the plural write data is written without being linked, because the other plural write data written before the plural write data are linked and written by the linking writing. Thereby, the tape storage device 10 sets to easily restart the accumulating writing.

The tape storage device 10 may delete the write data written by the accumulating writing, if the linking writing is finished. Alternatively, the tape storage device 10 may overwrite the new write data on the area employed for accumulating writing in the tape storage media 20. The tape storage device 10 may not delete the write data written by accumulating writing, in case that a write error occurs on the halfway of accumulating writing. In this case, the tape storage device 10 does not perform the linking writing. Thereby, the tape storage device 10 writes the write data appropriately, even if a write error occurs in the process of accumulating writing and linking writing.

Figure 7:
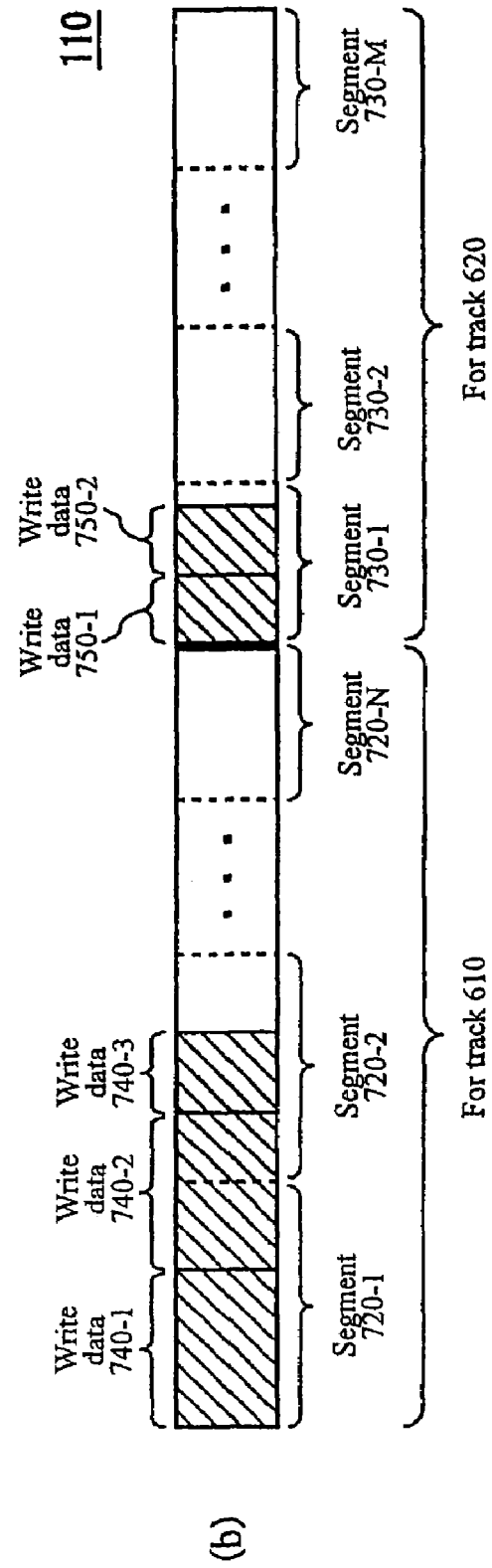
FIG. 7A shows a relationship between the processing time of the tape storage unit and the rewinding time of the tape storage media.
FIG. 7B shows one example of write data stored in a linking storage part.

FIG. 7A shows the relationship between the processing time of the tape storage device 10 and the rewinding time of the tape storage media 20. As described above, the linking writer 160 links the write data written by the sequential writer 120 and the reverse writer 150, and writes the write data from the write starting position on the tape storage media 20 into the track 600, in case that the progress quantity by the reverse writer 150 reaches the progress quantity standard value. However, the linking writer 160 links the write data written by the sequential writer 120 and the reverse writer 150, and writes the write data from the write starting position on the tape storage media 20 into the track 600, in case that writing the plural write data is finished even though the progress quantity by the reverse writer 150 does not reach the progress quantity standard value. In this case, the linking writer 160 must rewind the tape storage media 20 to the write starting position to write the linked write data.

Also, FIG. 7A shows the relationship between the processing time required to write the plural write data and the maximum rewind time with respect to the progress quantity standard value. As will be apparent from this figure, if the progress quantity standard value is set to be greater, the tape storage device 10 can decrease the processing time required to write the plural write data. Also, if the progress quantity standard value is set to be greater, the maximum rewind time required for rewinding is increased.

FIG. 7B shows one example of write data stored in the linking storage part 110. The linking storage part 110 has segments 720-1 to 720-N for storing the write data written in a forth direction in an accumulating write mode, and segments 730-1 to 730-M for storing the write data written in a back direction in the accumulating write mode. The linking storage part 110 assigns half of the storage area provided for the linking storage part 110 to the segments 720-1 to 720-N, and the remainder to the segments 730-1 to 730-M.

In case that the sequential writer 120 writes the write data in the forth direction, the linking storage part 110 sequentially writes the write data into the segments 720-1 to 720-N. For example, FIG. 7B shows a state where the linking storage part 110 sequentially writes the write data 740-1 to 740-3. And in case that the reverse writer 150 writes the write data in the back direction, the linking storage part 110 sequentially writes the write data into the segments 730-1 to 730-M. For example, FIG. 7B shows a state where the linking storage part 110 writes the write data 750-1 to 750-2.

Herein, the reverse writer 150 must rewind the tape storage media 20 to the write starting position, and can not use the storage area of the linking storage part 110 appropriately, in case that writing the plural write data is finished before the progress quantity by the reverse writer 150 reaches the progress quantity, whereby the efficiency is worse.

Accordingly, the progress quantity standard value adjuster 170 adjusts the progress quantity standard value for the plural write data to be written next to the plural write data in accordance with the total size of plural write data to decrease the time required for rewinding, and effectively utilize the storage area of the linking storage part 110. Thereby, in case that the size of plural write data to be written at the next time is almost equal to the total size of plural write data already written, the tape storage device 10 decreases the time required for rewinding and effectively utilizes the storage area of the linking storage part 110.

Figure 8:
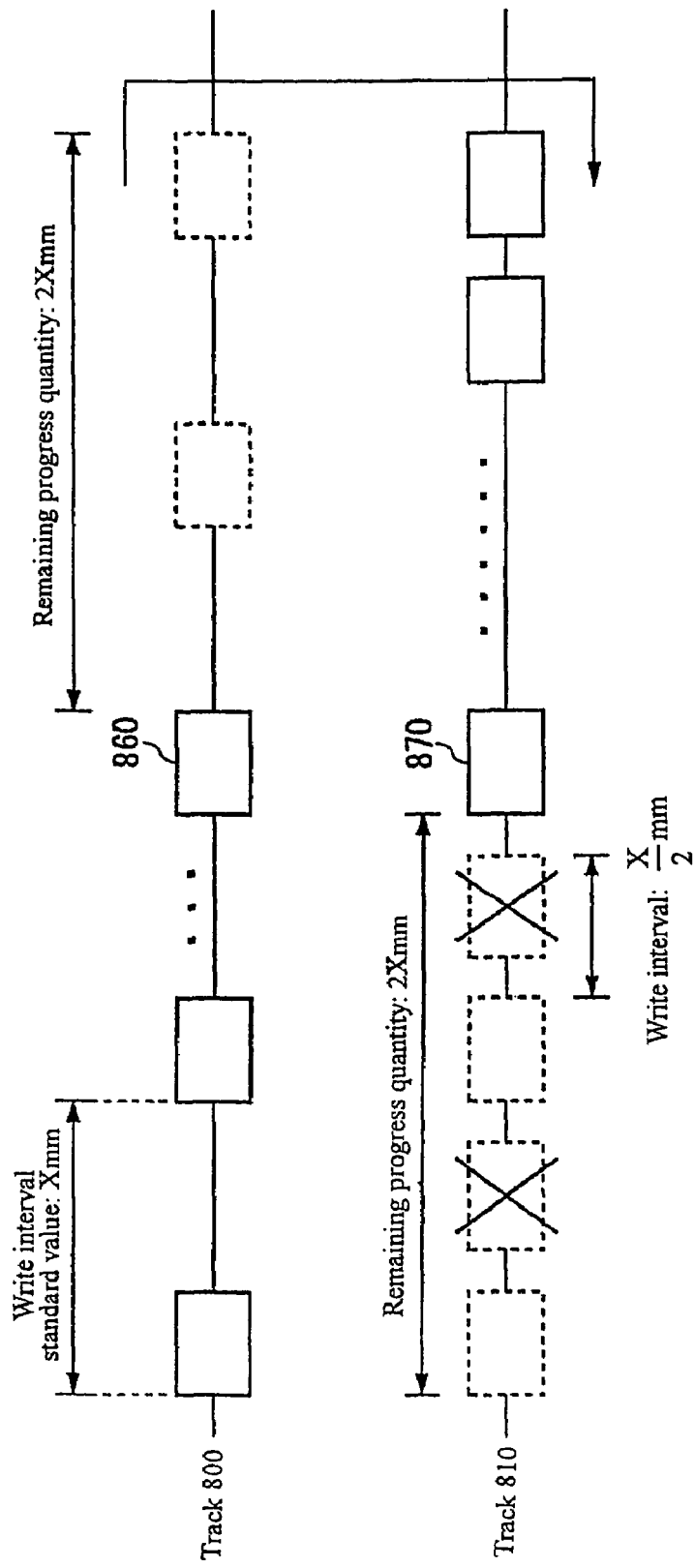
FIG. 8 shows a second example of the tape storage media on which write data is written by the tape storage unit.

FIG. 8 shows a second example of the tape storage media 20 on which the tape storage device 10 writes the write data. The tape storage media 20 has a plurality of tracks for sequentially recording the write data, for example, tracks 800 and 810.

In case that it is judged that the progress quantity of progressing the tape storage media 20 by the sequential writer 120 reaches the progress quantity standard value, the reverse writer 150 reverses the progress direction of the tape storage media 20. To make this judgment, for example, the reverse writer 150 designates beforehand the write data to be written at the time when the progress quantity reaches the progress quantity standard value, and it is judged that the progress quantity reaches the progress quantity standard value, at the time when the write data is written. Thereby, the tape storage device 10 does not need to judge the progress quantity, every time the write data is written, and determines beforehand the timing when the progress quantity standard value is reached. In this case, the reverse writer 150 must appropriately designate the write data to be written at the time when the progress quantity reaches the progress quantity standard value.

As one example, first of all, the reverse writer 150 designates the remaining progress quantity until the progress quantity standard value is reached, based on the position of the write data written by the sequential writer 120 on the tape storage media 20. And the reverse writer 150 divides the remaining progress quantity by the write interval standard value stored in the write interval standard value storage part 180 to calculate the number of write data capable of being further written in track 800. Thereby, the reverse writer 150 appropriately designates the write data to be written at the time when the progress quantity reaches the progress quantity standard value.

For example, in FIG. 8, the remaining progress quantity until the progress quantity reaches the progress quantity standard value at the time when the sequential writer 120 writes the write data 860 is equal to 2Xmm. And the write interval standard value storage part 180 stores Xmm as the write interval standard value. In this case, the reverse writer 150 divides the remaining progress quantity 2Xmm by the write interval standard value Xmm, thereby judging that the progress quantity standard value is reached at the time when more two write data are written, for example.

However, the interval between the write positions where the plural write data are written may be varied depending on the condition of an external device for generating the write data. In this case, if the write interval standard value is not changed, the tape storage device 10 can not appropriately utilize the storage area on the tape storage media 20 and the storage area on the linking storage part 110. For example, an instance in which the write interval standard value at the time when the sequential writer 120 writes the write data in the track 800 is Xmm, and the actual write interval after the reverse writer 150 reverses the write direction is X/2 mm will be described. In FIG. 8, the remaining progress quantity until the progress quantity reaches the progress quantity standard value is 2Xmm at the time when the adjustment suspending part 140 writes the write data 870. And the write interval standard value storage part 180 stores Xmm as the write interval standard value. In this case, the adjustment suspending part 140 divides the remaining progress quantity 2Xmm by the write interval standard value Xmm, thereby judging that the progress quantity standard value is reached at the time when more two write data are written, for example. However, since the actual write interval is X/2 mm, it is inefficiently judged that the progress quantity standard value is reached at the time when more two write data are written, though the tape storage device 10 can actually write more four write data.

To prevent this problem, the write interval standard value adjuster 190 resets the write interval standard value, for example, periodically. For example, in case that the interval of receiving the write data from the external device tends to be smaller when the size of write data is large than when the size of write data is small, the write interval standard value adjuster 190 sets the write interval standard value to a larger value when the size of write data is below a predetermined size than when the size of write data is above the predetermined size. Thereby, the tape storage device 10 appropriately designates the write data to be written at the time when the progress quantity standard value is reached.

Figure 9:
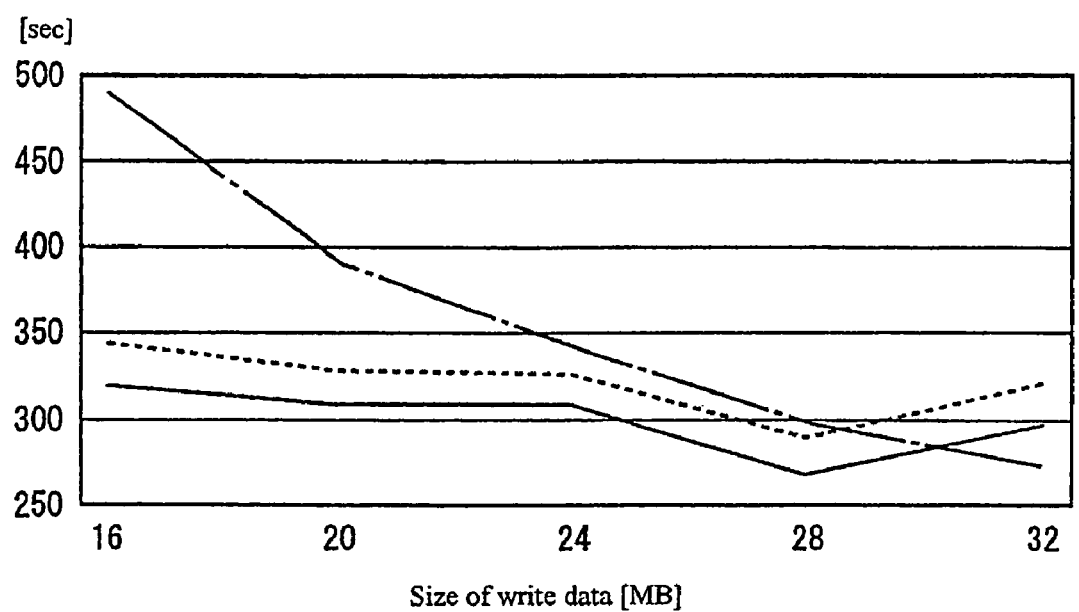
FIG. 9 shows a comparison between the back hitch writing and the RABF writing in the tape storage unit.

FIG. 9 shows a comparison between the backhitch writing and the RABF writing in the tape storage device 10. Also, FIG. 9 shows the relationship between the time required for writing the write data and the size of write data. The solid line in the figure indicates the time required for writing in the RABF writing, and the broken line indicates the time required for writing in the backhitch writing. In this manner, the RABF writing has the shorter time required for writing than the backhitch writing, when the size of write data is smaller than the predetermined size. Also, the dotted line in the figure indicates the time required for writing when a predetermined overhead occurs in the RABF writing. For example, the external device transferring the write data to the tape storage device 10 may have the void transfer interval of write data, which is caused by the time required to generate the write data and the delay time of data transfer on the transfer path of write data. Thereby, the tape storage device 10 has an interval for acquiring the write data in the RABF writing, though the high speed writing is enabled without making the backhitch writing, and may spend some time required for writing.

In this case, to appropriately judge the timing for transferring to the RABF writing, the data acquisition part 100 measure the time interval for receiving the write data and the linking writer 160 sets the predetermined size in accordance with the measured time interval. Thereby, the tape storage device 10 appropriately selects either the RABF writing or the backhitch writing, even in case that the interval of receiving the write data from the external device is changed.

Figure 10:
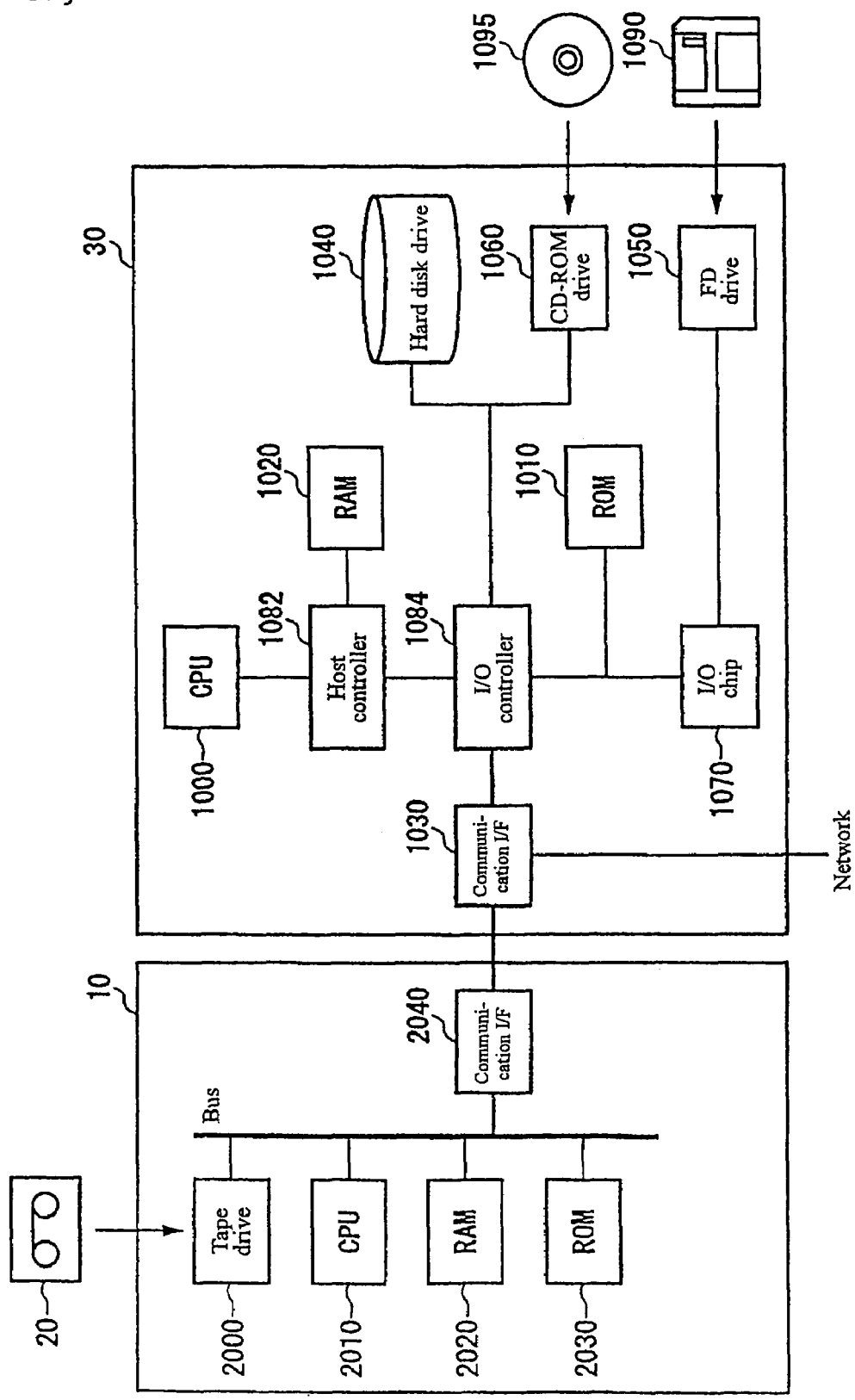
FIG. 10 shows one example of the hardware configuration of the tape storage unit.

FIG. 10 shows one example of the hardware configuration of the tape storage device 10 according to a modification to the embodiment. The tape storage device 10 comprises a tape drive 2000 interconnected via a bus, a CPU 2010, a RAM 2020, a ROM 2030, and a communication interface 2040.

The tape drive 2000 reads a program or data from the tape storage media 20 that is an example of program recording media or data recording media, and provides the read program or data to the ROM 2030. The ROM 2030 stores a boot program executed by a CPU 1000 when initiating the tape storage device 10, and a program for operating the tape storage device 10 after initiation. And the CPU 2010 executes any of these programs employing the RAM 2020.

The program provided to the tape storage device 10 is read from the tape storage media 20 by the tape drive 2000, and installed in the tape storage device 10. Alternatively, the communication interface 2040 may acquire the program from an information processing device 30 via an input/output unit such as a serial port or a network, and install the program in the tape storage device 10.

The information processing device 30 comprises a CPU peripheral unit having a CPU 1000 and a RAM 1020 interconnected by a host controller 1082, an input/output unit having a communication interface 1030 connected to the host controller 1082 by an input/output controller 1084, a hard disk drive 1040, and a CD-ROM drive 1060, and a legacy input/output unit having a ROM 1010 connected to the input/output controller 1084, a flexible disk drive 1050 and an input/output chip 1070.

The host controller 1082 connects the RAM 1020 with the CPU 1000 accessing the RAM 1020 at a high transfer rate. The CPU 1000 operates on the basis of the program stored in the ROM 1010 or the RAM 1020 to control each unit.

The input/output controller 1084 connects the host controller 1082, the communication interface 1030 that is the relatively fast input/output unit, the hard disk drive 1040 and the CD-ROM drive 1060. The communication interface 1030 communicates via the network with the tape storage device 10. The hard disk drive 1040 stores the program and data used by the tape storage device 10. The CD-ROM drive 1060 reads a program or data from the CD-ROM 1095, and provides the read program or data via the communication interface 1030 to the tape storage device 10.

Also, the input/output controller 1084 is connected to the ROM 1010 and a relatively low input/output unit such as the flexible disk drive 1050 or input/output chip 1070. The ROM 1010 stores a boot program executed by the CPU 1000 when initiating the tape storage device 10, and a program dependent on the hardware of the tape storage device 10. The flexible disk drive 1050 reads a program or data from a flexible disk 1090 and provides the read program or data via the RAM 1020 to the input/output chip 1070. The input/output chip 1070 is connected to the flexible disk 1090 and various types of input/output units via a parallel port, a serial port, a keyboard port and a mouse port.

The program provided to the tape storage device 10 is stored in the program storage media such as flexible disk 1090, CD-ROM 1095 or IC card, and provided to the user. The program is read from the program storage media, installed via the communication interface 1030 in the tape storage device 10 and executed by the tape storage device 10.

The programs installed in the tape storage device 10 and executed may include a data acquisition module, a linking storage module, a sequential writing module, a write position adjusting module, an adjustment suspending module, a reverse writing module, a linking writing module, a progress quantity standard value adjusting module, a write interval standard value storing module, and a write interval standard value adjusting module. The operation of each module on the tape storage device 10 is the same as that of the corresponding member in the tape storage device 10 as described with reference to FIGS. 1 to 9, and not described here.

Those programs or modules may be stored in the external storage media. The storage media may include the flexible disk 1090, the CD-ROM 1095, optical recording media such as DVD and PD, optical magnetic recording media such as MD, tape storage media, and semiconductor memories such as IC card. Also, the program or module may be provided via the network to the tape storage device 10, employing a storage device such as a hard disk or RAM provided in a server system connected to a dedicated communication network or the Internet as the program storage media.

As described above, the tape storage device 10 suspends to adjust the write position for the write data after one write data, in case of detecting the one write data of the size smaller than the predetermined size. Thereby, the tape storage device 10 performs high speed writing by saving the rewind time for rewinding the tape storage media 20 to adjust the write position. Also, the tape storage device 10 stores the write data after one write data in the linking storage part 110 and rewrites the linked write data into the tape storage media 20, in case of detecting the one write data of the size smaller than the predetermined size. Thereby, the tape storage device 10 efficiently utilizes the storage area of the tape storage media 20. And the tape storage device 10 sets the predetermined size and the preset number of times for judging whether or not to suspend to adjust the write position based on the size of received write data and the time interval for receiving the write data, and the progress quantity standard value and the write interval standard value for use to judge whether or not the accumulating writing is finished. Thereby, the tape storage device 10 makes high speed and high efficient operation by appropriately switching the writing method for writing the write data into the tape storage media 20, based on the trends such as the size of received write data.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such single-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A data storage device comprising:
   a forward sequential writer capable of sequentially forward writing data to a first track of multiple tracks on a tape storage media, said forward writing starting at a first write starting position and ending at a predetermined first write ending position, wherein the predetermined first write ending position leaves enough room before an end of the tape storage media to permit future data writing between the predetermined first write ending position and the end of the tape storage media;
   a reverse writer capable of writing the data on a second track of the multiple tracks on the tape storage media, the reverse writer continuing writing of the data in a reverse direction as that written by the forward sequential writer, the reverse writer writing the data in response to the forward sequential writer reaching the predetermined first write ending position;
   in response to the reverse writer not completing writing of the data before reaching the predetermined first write starting position, a linking writer linking the data and completing writing the data from a second write starting position on a third track on said tape storage media, the linking writer not being limited by a predetermined write ending position; and
   a progress quantity standard value adjuster for adjusting a progress quantity standard value for a next set of data to be forward and reverse written.

2. The data storage device of claim 1, wherein a distance from a write starting position to a write ending position, used by the forward and reverse writers for a next data, is the same as the distance described by the progress quantity standard value adjusted by the progress quantity standard value adjuster.

3. The data storage device of claim 1, wherein a distance from a write starting position to a write ending position, used by the forward and reverse writers for a next data, is greater than the distance described by the progress quantity standard value adjusted by the progress quantity standard value adjuster.

4. The data storage device of claim 1, wherein a distance from a write starting position to a write ending position, used by the forward and reverse writers for a next data, is less than the distance described by the progress quantity standard value adjusted by the progress quantity standard value adjuster.

5. A method comprising:
   sequentially forward writing, by a forward sequential writer, data to a first track of multiple tracks on a tape storage media, said forward writing starting at a first write starting position and ending at a predetermined first write ending position;
   reverse writing, by a reverse writer, a continuation of the data on a second track of the multiple tracks on the tape storage media, the reverse writing of the data being in a reverse direction as that written by the forward sequential writer, the reverse writer writing the data in response to the forward sequential writer reaching the predetermined first write ending position;
   in response to the reverse writer not completing writing of the data before reaching the predetermined first write ending position, a linking writer linking the data and completing writing the data from a second write starting position on a third track on said tape storage media, the linking writer not being limited by a predetermined write ending position; and
   adjusting a progress quantity standard value for a next set of data to be forward and reverse written.

6. The method of claim 5, wherein a distance from a write starting position to a write ending position, used by the forward and reverse writers for a next data, is the same as the distance described by the progress quantity standard value adjusted by the progress quantity standard value adjuster.

7. The method of claim 5, wherein a distance from a write starting position to a write ending position, used by the forward and reverse writers for a next data, is greater than the distance described by the progress quantity standard value adjusted by the progress quantity standard value adjuster.

8. The method of claim 5, wherein a distance from a write starting position to a write ending position, used by the forward and reverse writers for a next data, is less than the distance described by the progress quantity standard value adjusted by the progress quantity standard value adjuster.

9. A method for writing a string of data to a tape storage media, the method comprising:
   forward writing a first portion of a string of data to a first track on a tape storage media, wherein the forward writing begins at a first linear position on the tape storage media and ends at a second linear position on the tape storage media;

reverse writing a subsequent second portion of the string of data to a second track on the tape storage media, wherein the reverse writing begins at the second linear position on the tape storage media and ends at the first linear position on the tape storage media; and in response to the first portion and the subsequent second portion being equal to a progress quantity standard value, forward writing all of the string of data in a third track on the tape storage media.

10. The method of claim 9, wherein the forward writing of all of the string of data starts on the third track at the first linear position on the tape storage media.

* * * * *

UNITED STATES PATENT AND TRADEMARK OFFICE
CERTIFICATE OF CORRECTION

PATENT NO. : 7,631,141 B2
APPLICATION NO. : 10/846318
DATED : December 8, 2009
INVENTOR(S) : Terue Watanabe Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Second Day of November, 2010

David J. Kappos
*Director of the United States Patent and Trademark Office*